UNITED STATES PATENT OFFICE 2,177,427

AZO DYESTUFFS

Friedrich Felix, Basel, and Rudolf von Capeller, Riehen, Switzerland, assignors to the firm Society of Chemical Industry in Basle, Basel, Switzerland No Drawing. Application March 12, 1938, Serial No. 195,658. In Switzerland March 15, 1937

12 Claims. (Cl. 260—206)

It has been found that azo-dyestuffs which are obtained by coupling any diazo compounds with components of the general formula

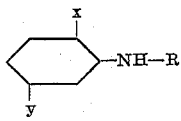

wherein R stands for a substituted aromatic isocyclic six-membered nucleus containing a sulfonic acid group and $x$ and $y$ stand for organic substituents of non-ionogenic nature, possess valuable properties. The expression "substituents of non-ionogenic nature" as above used is understood to include alkyl-groups, such as methyl, ethyl, propyl or also alkyl radicals of higher molecular weight, further alkyl radicals which are linked to the nucleus by means of oxygen atoms, for example methyloxy-groups, ethoxy-groups, or also such groups which contain a greater number of carbon atoms, for instance —$O.C_3H_7$, —$O.C_4H_9$, —$O.C_{12}H_{25}$ groups. By the above expression there may also be understood phenyl, tolyl, benzyl and the like radicals, further acidylated amino-groups, such as acetylamino-groups, butyrylamino-groups, chloroacetylamino-groups, benzoylamino-groups, and the like. The azo-dyestuffs correspond therefore to the following general formula

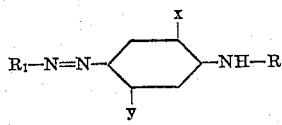

wherein $R_1$ stands for an aromatic isocyclic six-membered nucleus and $x$, $y$ and R have the signification indicated above. They are obtained according to the usual methods by coupling a diazo compound derived from an amine corresponding to the symbol $R_1$ with the coupling components of the above indicated general formula.

It has been found that among these azo-dyestuffs those are particularly valuable which correspond to the general formula

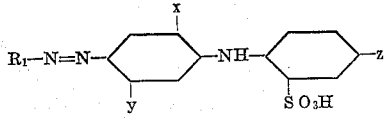

wherein $R_1$ stands for an aromatic isocyclic six-membered nucleus, $x$ and $y$ have the signification indicated above, and $z$ stands for hydrogen, halogen or an acidylated amino-group.

The coupling components to be used in the present invention are produced by condensing an aromatic amine derived from an aromatic isocyclic six-membered nucleus which contains in 2- and 5-position to the amino-group substituents which are non-ionogenic, with aromatic sulfonic acids containing a reactive halogen atom, so that a diphenylamine derivative is formed thereby. Such sulfonic acids are for example 1-chloro-4-nitrobenzene-2-sulfonic acid, 1-chloro-2-nitrobenzene-4-sulfonic acid, 1:6-dichloro-4-nitrobenzene-2-sulfonic acid, and the like. The nitro groups can then be reduced and the newly formed amino-group can for example be acidylated, for instance by treatment with any desired acids, their esters or anhydrides. The free amino-group may also be diazotized and the diazo radical may be exchanged for hydrogen or halogen according to known methods. For the reaction with the above named aromatic sulfonic acids containing a reactive halogen atom the following bases are especially suitable: 2:5-dimethylaminobenzene, 2-methoxy-5-methylaminobenzene, 2-ethoxy-5-methylaminobenzene, 2:5-dimethoxyaminobenzene, 2:5-diethoxyaminobenzene, 2-methoxy-5-acetylaminobenzene, 2-ethoxy-5-acetylaminobenzene, 2:5-diethylaminobenzene, and the like. The condensation preferably consists in causing for example the 4-nitro-1-chlorobenzene-2-sulfonic acid in the form of an alkali salt to react in aqueous solution with 2 mols of one of the aforesaid bases in a closed vessel. The base which has not entered into reaction may be recovered by distillation with steam of a weakly alkaline solution. Instead of 1 mol of the base another acid binding agent, for instance sodium carbonate, magnesium oxide, calcium carbonate or the like may be used. The nitro-group may be reduced by a usual method, for example by means of iron in the neutral or feebly acid solution. This newly produced free amino-group may be acidylated by a usual acidylating agent in known manner or can be converted into the diazo-compound and this exchanged in the usual manner for halogen or hydrogen.

The following coupling components are, therefore, especially useful for this invention: (3-methyl-6-methoxy-2'-sulfonic acid-4'-acetylamino)-N-diphenylamine, (3-methyl-6-methoxy-2'-sulfonic acid-4'-chloracetylamino)-N-diphenylamine, (3-methyl-6-methoxy-2'-sulfonic acid-4'-benzoylamino)-N-diphenylamine, (3-methyl-6-methoxy-2'-sulfonic acid-4'-ortho-chlorobenzoylamino)-N-diphenylamine, (3-methyl-6-methoxy-2'-sulfonic acid-4'-chloro)-N-diphenylamine, (3 - methyl - 6 - methoxy - 2' - sulfonic acid) -N-diphenylamine. Instead of the products containing methoxy groups here named the corresponding ethoxy compounds may be used, for example (3-methyl-6-ethoxy-2'-sulfonic acid-4'-acetylamino)-N-diphenylamine, (3-methyl-6-ethoxy-2'-sulfonic acid-4'-chloracetylamino)-N-diphenylamine, (3-methyl-6-ethoxy-2'-sulfonic acid)-N-diphenylamine. Furthermore, products may be used which contain instead of the 3-methyl group an alkoxy group, so that the following products are available: (3:6-dimethoxy-2'- sulfonic acid)-N-diphenylamine, (3:6-dimethoxy-2'-sulfonic acid-4'-chloracetylamino)-N-diphenylamine, (3:6-diethoxy-2'-sulfonic acid-4'-chloracetylamino-)-N-diphenylamine, and also products such as (3-acetylamino-6-methoxy- or -ethoxy-2'-sulfonic acid-4'-acetylamino- or -chloracetylamino-)-N-diphenylamine, finally also products such as (3-methyl-6-methoxy-2'-sulfonic acid-4'-acetylamino-6'-chloro)-N-diphenylamine, or (3-methyl-6-methoxy-2'-sulfonic acid-4-chloracetylamino-6'-chloro)-N-diphenylamine.

As diazo-compounds there come into question those from aminobenzene, chloroaminobenzenes, methoxyaminobenzenes, aminobenzene sulfonic acids, 1-amino-2:5-dichlorobenzene, 1-amino-4-alkoxyaminobenzene, further particularly 1-amino-3-nitrobenzene, 1-amino-2-methoxy-3-nitrobenzene, 1-amino-2-nitrobenzene, 4-nitroaminobenzenes, such as 4-nitroaminobenzene, 4-nitroaminobenzene-2-sulfonic acid, 4-nitro-2-chloraminobenzene, 4-nitro-2-chloro-6-cyanoaminobenzene, 4-nitro-2:6-dichloraminobenzene; also 1-amino-4-nitrobenzene-2-phenylsulfones, 1-amino-4-nitrobenzene-2-alkylsulfones, for instance 1-amino-4-nitrobenzene-2-methylsulfone, 1-amino-4-nitrobenzene-2-ethylsulfone, 1-amino-4-nitrobenzene-2-benzylsulfone, 1-amino-4-nitrobenzene-6-chloro-2-methylsulfone, 1-amino-2:4-dinitro-6-chlorobenzene, 1-amino-4-nitro-2-cyanobenzene.

The dyestuffs obtainable are soluble in water and are suitable for dyeing and printing animal materials, such as wool, leather and silk, as well as for dyeing and printing acetate silk. By using these products, red, brown, violet and blue dyed materials may be obtained. The fastness of the dyeings is in general good, the dyestuffs dye in general level tints fast to washing, water and light, and capable of good discharge. The dyeings are also stable to sulfurous acid.

The following examples illustrate the invention, the parts being by weight:

Example 1

A mineral acid solution containing a diazo-compound from 216 parts of 1-amino-4-nitrobenzene-2-methylsulfone is gradually introduced while stirring well into an aqueous solution of the sodium salt from 350 parts of (6-methoxy-3-methyl-2'-sulfonic acid-4'-acetylamino)-N-diphenylamine. The formation of dyestuff can be completed by addition of a neutralizing agent, for instance sodium acetate. The dyestuff is precipitated or can be salted out. It is then filtered and freed from acid by treatment with a neutralizing agent, for instance sodium carbonate or ammonia. The product corresponds to the formula

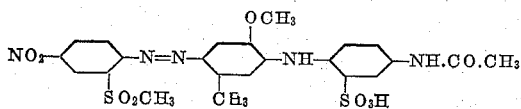

When dry it is a dark powder soluble in water to a reddish violet solution and dyeing wool in an acid bath fast bluish violet tints.

The coupling component used in this example is made by heating 2 mols of 1-amino-2-methoxy-5-methylbenzene with 1 mol of the sodium salt of 1-chloro-4-nitrobenzene-2-sulfonic acid in aqueous solution in a stirring autoclave, for about 18 hours at 130–170° C. The condensation product thus obtained is then neutralized with sodium carbonate, the excess of 1-amino-2-methoxy-5-methylbenzene is distilled with steam and then the mass is reduced with iron as usual in an aqueous acid solution. The sulfonic acid may be acylated directly in aqueous solution by treatment with acetic anhydride. Also other acidyl radicals can be introduced into this coupling component or similar coupling components. The reduction product may for example be formylated, it may also be treated with benzene-sulfonic acid chloride, with toluene-sulfonic acid chloride, or also with methane- or ethane-sulfonic acid chloride. Further also with sulfo-phthalic acid chloride, with phthalic acid anhydride, with mono-, di or trichloro-acetic acid chloride, or with butyric acid chloride. The solutions thus obtained may be used directly for making the dyestuffs.

Instead of the coupling component named in this example there may also be used the condensation product from 2:5-dimethyl- or 2:5-diethyl-1-aminobenzene with 1-chloro-2-nitrobenzene-4-sulfonic acid, which product is produced in similar manner from 2:5-dimethyl-1-aminobenzene and 1-chloro-2-nitrobenzene-4-sulfonic acid.

Instead of 1-amino-4-nitrobenzene-2-methylsulfone there may be used with like result 1-amino-2:4-dinitro-6-chloro- or -6-bromobenzene, also 1-amino-4-nitro-2-cyanobenzene or 1-amino-4-nitro-2-cyano-6-chloro- or -6-bromobenzene.

Yellow to orange dyeing dyestuffs are obtained with the diazo compounds which are obtained from 1-amino-2:5-dichlorobenzene or 1-amino-4-ethoxybenzene, 1-amino-3-nitrobenzene or 1-amino-2-methoxy-3-nitrobenzene.

Example 2

216 parts of 1-amino-4-nitrobenzene-2-methylsulfone are diazotized and the acid diazo solution is introduced into a solution of the sodium salt from 364 parts of (6-ethoxy-3-methyl-2'-sulfonic acid-4'acetylamino)-N-diphenylamine. The procedure is similar to that described in Example 4 and there is obtained a dark powder of the formula

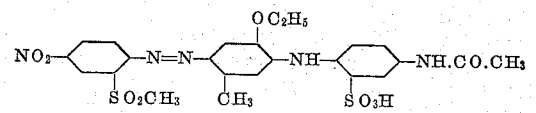

which dyes wool in an acid bath reddish blue tints.

The other diazo-compounds cited in Example 1 can also be used in this example with similar success.

Example 3

216 parts of 1-amino-4-nitrobenzene-2-methylsulfone are diazotized and into the mineral acid solution of this diazo compound there is introduced a solution of the sodium salt from 398 parts of (6-ethoxy-3-methyl-2'-sulfonic acid-4'-chloracetylamino)-N-diphenylamine. When the formation of this dyestuff is complete, the whole is filtered and the dyestuff is suspended in water and made neutral by stirring with an alkali. The dyestuff is precipitated by adding a salt, then filtered and dried. It is a dark powder of the formula

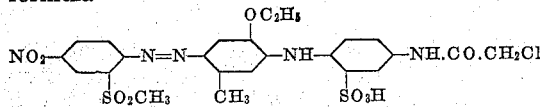

soluble in water to a violet-blue solution and dyeing wool in an acid bath fast violet-blue tints.

Similar dyestuffs are obtained if instead of the coupling component named in this example there is used the product obtainable by condensing 2:5-diethoxy-1-aminobenzene with 1-chloro-2-nitrobenzene-4-sulfonic acid, and if desired reducing and treating this condensation product with 1-chloroacetic acid chloride or with benzoyl chloride. There may also be used products of the formulas

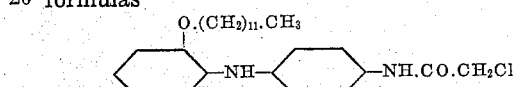

or

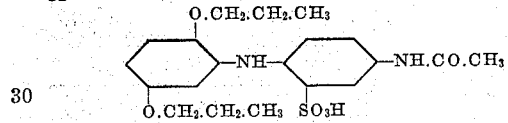

which are produced in analogous manner. Further, there may be used products of the formula

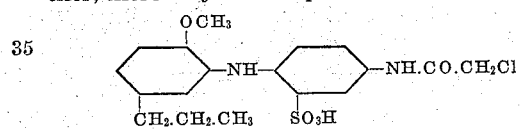

as well as products of the formula

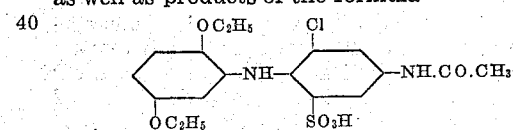

The procedure is the same in making the dyestuff from the above diazo-compound and (6-ethoxy-3-methyl-2'-sulfonic acid-4'-chloracetyl-amino-6'-chloro)-N-diphenylamine, of which 433 parts are used. The dyestuff in this case dyes wool violet tints.

*Example 4*

216 parts of 1-amino-4-nitrobenzene-2-methylsulfone are diazotized and into a mineral acid solution of the diazo-compound is introduced a solution of the sodium salt from 306 parts of (6-ethoxy-3-methyl-2'-sulfonic acid)-N-diphenylamine. The further operation follows Example 3 and there is obtained a dyestuff of the formula

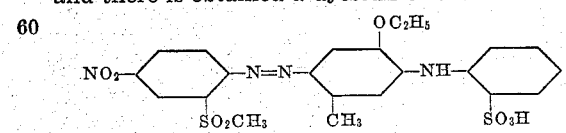

which dyes wool pure violet tints. When other diazo-compounds are used, for example diazotized 4-nitroaminobenzene, diazotized 4-nitro-2-chloraminobenzene, dyestuffs which dye redder are obtained. A brown-red dyestuff is obtained by using 4-nitro-1-methoxyaminobenzene.

The coupling component used in this example may be made by diazotizing (6-ethoxy-3-methyl-2'-sulfonic acid-4'-amino)-N-diphenylamine and stirring this diazo-compound with alcohol in the presence of copper. By filtration and distillation the new coupling component is obtained which may be purified by dissolution in water and treating the solution with animal charcoal. It may advantageously be used directly in this solution.

*Example 5*

The diazo-compound from 216 parts of 1-amino-4-nitrobenzene-2-methylsulfone is coupled with a solution of the sodium salt from 433 parts of (6-ethoxy-3-methyl-2'-sulfonic acid-4'-ortho-chlorobenzoylamino)-N-diphenylamine. The further operations are as those described in the preceding examples and there is obtained a dark powder of the formula

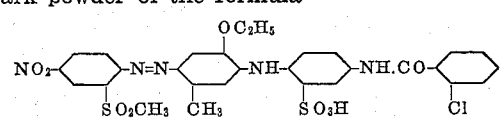

soluble in water to a blue solution and dyeing wool in an acid bath blue tints. Similar results are obtained when 1-amino-4-nitrobenzene-2-dimethylsulfamide or 1-amino-4-nitrobenzene-2-phenylethylsulfamide is used.

*Example 6*

207 parts of 2:6-dichloro-4-nitroaminobenzene are diazotized in concentrated sulfuric acid. The mass is poured upon ice water and mixed with a neutral solution of the sodium salt from 398 parts of (6-ethoxy-3-methyl-2'-sulfonic acid-4'-chloracetylamino)-N-diphenylamine. The dyestuff formation can be accelerated or completed by addition of an acid-binding agent, for example sodium acetate. The isolated dyestuff is a dark powder of the formula

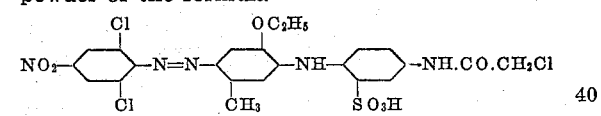

which dyes wool in an acid bath red-brown tints.

*Example 7*

The diazo-compound from 207 parts of 2:6-dichloro-4-nitroaminobenzene is coupled with a solution of the sodium salt from 306 parts of (6-ethoxy-3-methyl-2'-sulfonic acid)-N-diphenylamine. The dyestuff of the formula

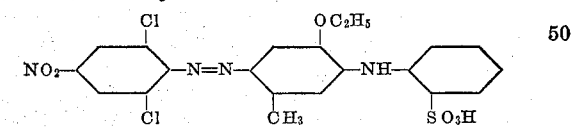

is isolated in the usual manner. It dyes wool in an acid bath red-brown tints. It may also be used for dyeing and printing acetate artificial silk. Instead of 2:6-dichloro-4-nitroaminobenzene there may be used 2-cyano-6-chloro-4-nitroaminobenzene.

*Example 8*

0.5 part of the dyestuff of Example 7 is dissolved in 3000 parts of water. To this dye-bath are added 40 parts of crystallized sodium sulfate, and 100 parts of acetate artificial silk yarn are treated in the bath for one hour at 80° C. After rinsing and drying there is obtained acetate artificial silk dyed brownish red.

*Example 9*

0.5 part of the dyestuff obtained as described in Example 4 is dissolved by boiling with 1000 parts of water. The dye-bath is prepared with 2500 parts of water at 50–60° C., the dissolved dyestuff is added and then 500 parts of water.

To this 4000 parts of liquor containing the dye there are added 10 parts of crystallized sodium sulfate; 100 parts of wool are entered at 50-60° C. and then there are added 40 parts of sulfuric acid of 10 per cent. strength. After gradually heating to 85-90° C., dyeing is continued for one hour at this temperature. After the usual finishing there is obtained a bluish violet dyeing having good properties of fastness and only slightly changing in tint in artificial light.

What we claim is:

1. Azo-dyestuffs of the general formula

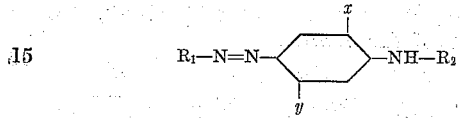

wherein $R_1$ stands for an aromatic isocyclic six-membered nucleus, $R_2$ stands for a sulfonated aromatic, isocyclic six-membered nucleus, and $x$ and $y$ stand for organic substituents of non-ionogenic nature, which dyestuffs are light to dark powders which are soluble in water and dye textiles such as wool, silk and acetate artificial silk yellow, red, violet, brown and blue tints.

2. Azo-dyestuffs of the general formula

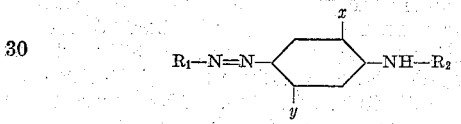

wherein $R_1$ stands for an aromatic isocyclic six-membered nucleus substituted by a nitro-group, $R_2$ stands for a sulfonated aromatic, isocyclic six-membered nucleus, and $x$ and $y$ stand for organic substituents of non-ionogenic nature, which dyestuffs are light to dark powders which are soluble in water and dye textiles such as wool, silk and acetate artificial silk yellow, red, violet, brown and blue tints.

3. Azo-dyestuffs of the general formula

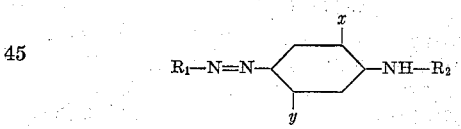

wherein $R_1$ stands for an aromatic isocyclic six-membered nucleus substituted by a nitro-group standing in para-position to the azo-bridge, $R_2$ stands for a sulfonated aromatic, isocyclic six-membered nucleus, and $x$ and $y$ stand for organic substituents of non-ionogenic nature, which dyestuffs are light to dark powders which are soluble in water and dye textiles such as wool, silk and acetate artificial silk red, violet, brown and blue tints.

4. Azo-dyestuffs of the general formula

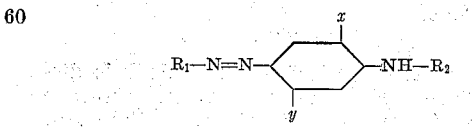

wherein $R_1$ stands for an aromatic isocyclic six-membered nucleus substituted by a nitro-group standing in para-position to the azo-bridge, $R_2$ stands for a sulfonated aromatic, isocyclic six-membered nucleus wherein the sulfonic acid group stands in ortho-position to the NH-group, and $x$ and $y$ stand for organic substituents of non-ionogenic nature, which dyestuffs are light to dark powders which are soluble in water and dye textiles such as wool, silk and acetate artificial silk red, violet, brown and blue tints.

5. Azo-dyestuffs of the general formula

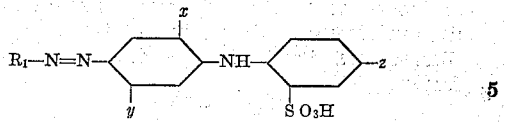

wherein $R_1$ stands for an aromatic, isocyclic six-membered nucleus substituted by a nitro-group standing in para-position to the azo-bridge, $x$ and $y$ stand for organic substituents of non-ionogenic nature, and $z$ stands for a member of the group consisting of hydrogen, halogen, and an acidylated amino-group, which dyestuffs are light to dark powders which are soluble in water and dye textiles such as wool, silk and acetate artificial silk red, violet, brown and blue tints.

6. Azo-dyestuffs of the general formula

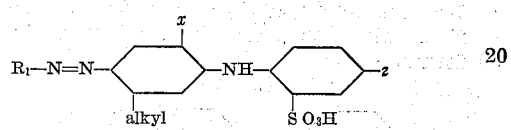

wherein $R_1$ stands for an aromatic isocyclic six-membered nucleus substituted by a nitro-group standing in para-position to the azo-bridge, $x$ stands for an organic substituent of non-ionogenic nature, and $z$ stands for a member of the group consisting of hydrogen, halogen and an acidylated amino-group, which dyestuffs are light to dark powders which are soluble in water and dye textiles such as wool, silk and acetate artificial silk red, violet, brown and blue tints.

7. Azo-dyestuffs of the general formula

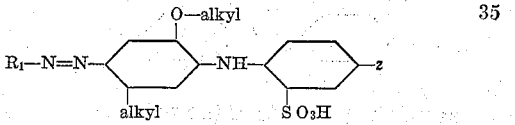

wherein $R_1$ stands for an aromatic isocyclic six-membered nucleus substituted by a nitro-group standing in para-position to the azo-bridge, and $z$ stands for a member of the group consisting of hydrogen, halogen and an acidylated amino-group, with dyestuffs are light to dark powders which are soluble in water and dye textiles such as wool, silk and acetate artificial silk red, violet, brown and blue tints.

8. Azo-dyestuffs of the general formula

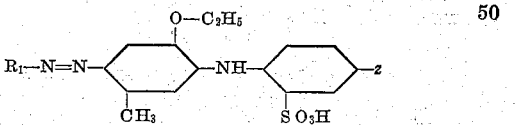

wherein $R_1$ stand for an aromatic isocyclic six-membered nucleus substituted by a nitro-group standing in para-position to the azo-bridge, and $z$ stands for a member of the group consisting of hydrogen, halogen and an acidylated amino-group, which dyestuffs are light to dark powders which are soluble in water and dye textiles such as wool, silk and acetate artificial silk red, violet, brown and blue tints.

9. Azo-dyestuffs of the general formula

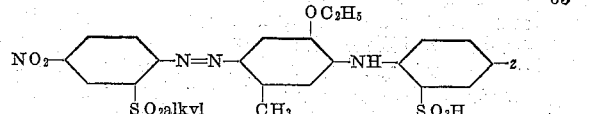

wherein $z$ stands for a member of the group consisting of hydrogen, halogen, and an acidylated amino-group, which dyestuffs are blue powders which are soluble in water and dye textiles such as wool, silk and acetate artificial silk blue tints.

10. The azo-dyestuff of the formula

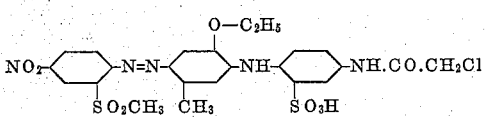

which dyestuff is a blue powder which is soluble in water and dyes textiles such as wool, silk and acetate artificial silk blue tints.

11. The dyestuff of the formula

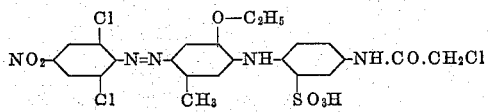

which dyestuff is a brown powder which is soluble in water and dyes textiles such as wool, silk and acetate artificial silk brown tints.

12. The azo-dyestuff of the formula

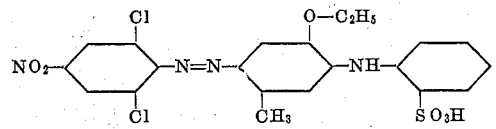

which dyestuff is a brown powder which is soluble in water and dyes textiles such as wool, silk and acetate artificial silk brown tints.

FRIEDRICH FELIX.
RUDOLF VON CAPELLER.